United States Patent
Army, Jr. et al.

(10) Patent No.: US 7,188,488 B2
(45) Date of Patent: Mar. 13, 2007

(54) PACK AND A HALF CONDENSING CYCLE PACK WITH COMBINED HEAT EXCHANGERS

(75) Inventors: Donald E. Army, Jr., Enfield, CT (US); Douglas L. Christians, Vernon, CT (US); Frederick Peacos, III, Ellington, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 362 days.

(21) Appl. No.: 10/387,139

(22) Filed: Mar. 12, 2003

(65) Prior Publication Data
US 2004/0177639 A1    Sep. 16, 2004

(51) Int. Cl.
*F25D 9/00* (2006.01)

(52) U.S. Cl. .......................... 62/402; 62/401
(58) Field of Classification Search ................. 62/87, 62/401, 402, 172, 88
See application file for complete search history.

(56) References Cited

U.S. PATENT DOCUMENTS

| | | | | |
|---|---|---|---|---|
| 4,458,866 | A * | 7/1984 | Graves ......................... | 248/65 |
| 5,511,385 | A * | 4/1996 | Drew et al. ................... | 62/172 |
| 5,704,218 | A * | 1/1998 | Christians et al. ............ | 62/172 |
| 6,148,622 | A | 11/2000 | Sanger | |
| 6,250,097 | B1 * | 6/2001 | Lui et al. ...................... | 62/402 |
| 6,257,003 | B1 * | 7/2001 | Hipsky ........................... | 62/88 |
| 6,415,621 | B2 * | 7/2002 | Buchholz et al. ............. | 62/402 |
| 6,516,873 | B1 * | 2/2003 | Haugen ......................... | 165/145 |
| 6,526,775 | B1 * | 3/2003 | Asfia et al. .................... | 62/402 |
| 2003/0084681 | A1 * | 5/2003 | Haas ........................... | 62/402 |
| 2003/0177780 | A1 * | 9/2003 | Brutscher et al. ............. | 62/401 |
| 2003/0177781 | A1 * | 9/2003 | Haas et al. .................... | 62/402 |

FOREIGN PATENT DOCUMENTS

| | | |
|---|---|---|
| EP | 0147987 | 7/1985 |
| EP | 1 283 165 A2 | 2/2003 |
| EP | 1 329 380 A1 | 7/2003 |
| WO | WO/98/48162 | 10/1998 |

OTHER PUBLICATIONS

Search Report EP04251404.

* cited by examiner

*Primary Examiner*—William C. Doerrler
(74) *Attorney, Agent, or Firm*—Carlson, Gaskey & Olds

(57) ABSTRACT

The present invention provides an air generation unit (AGU) including a pressurized air source, such as an engine providing pressurized air. First and second air cycle machine (ACM) are fluidly connected to the pressurized air source for receiving the air. A heat exchanger interconnects the first and second ACMs. The heat exchanger mechanically supports the first and second ACMs by flexible isolators, which accommodates the thermo expansion of the heat exchanger through out the operation of the AGU. The heat exchanger includes a primary heat exchanger that cools the air from the air source. The ACMs each include a compressor receiving the air from the primary heat exchanger to provide compressed air. The compressed air is sent to a secondary heat exchanger to be cooled. The compressed air is passed through a condenser and a water collector to remove moisture from the air for being sent to a first turbine. The first turbine expands the dehumidified air to produce a first conditioned air having a first temperature. A second turbine further expands the conditioned air to produce a second conditioned air having a second temperature.

10 Claims, 4 Drawing Sheets

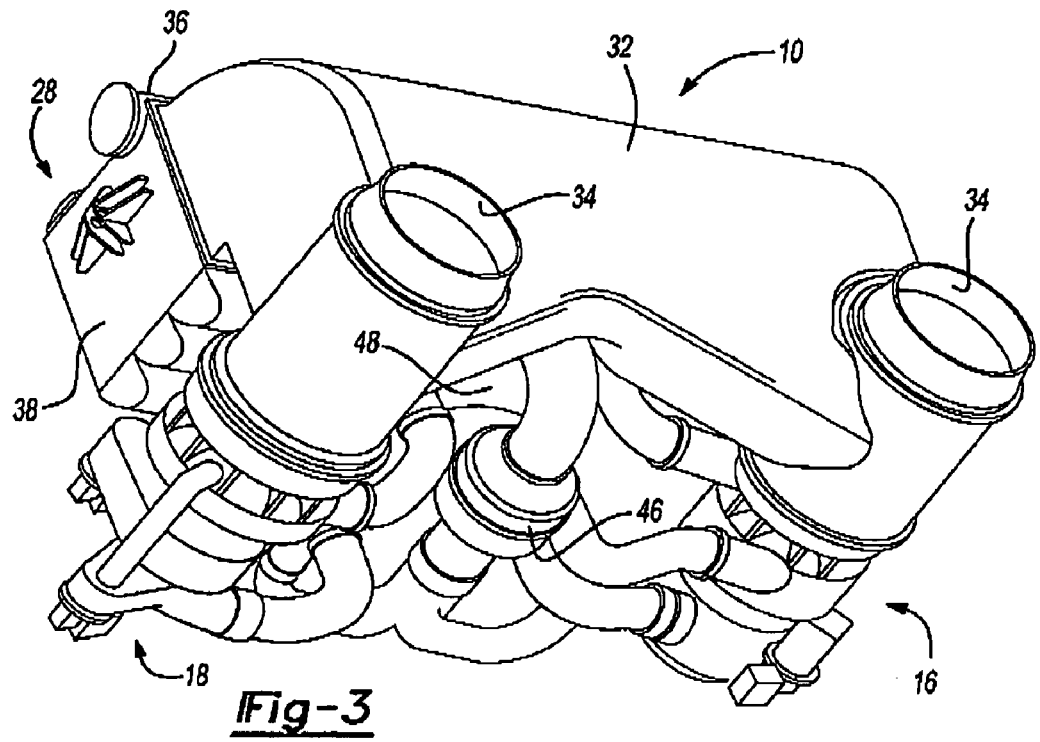
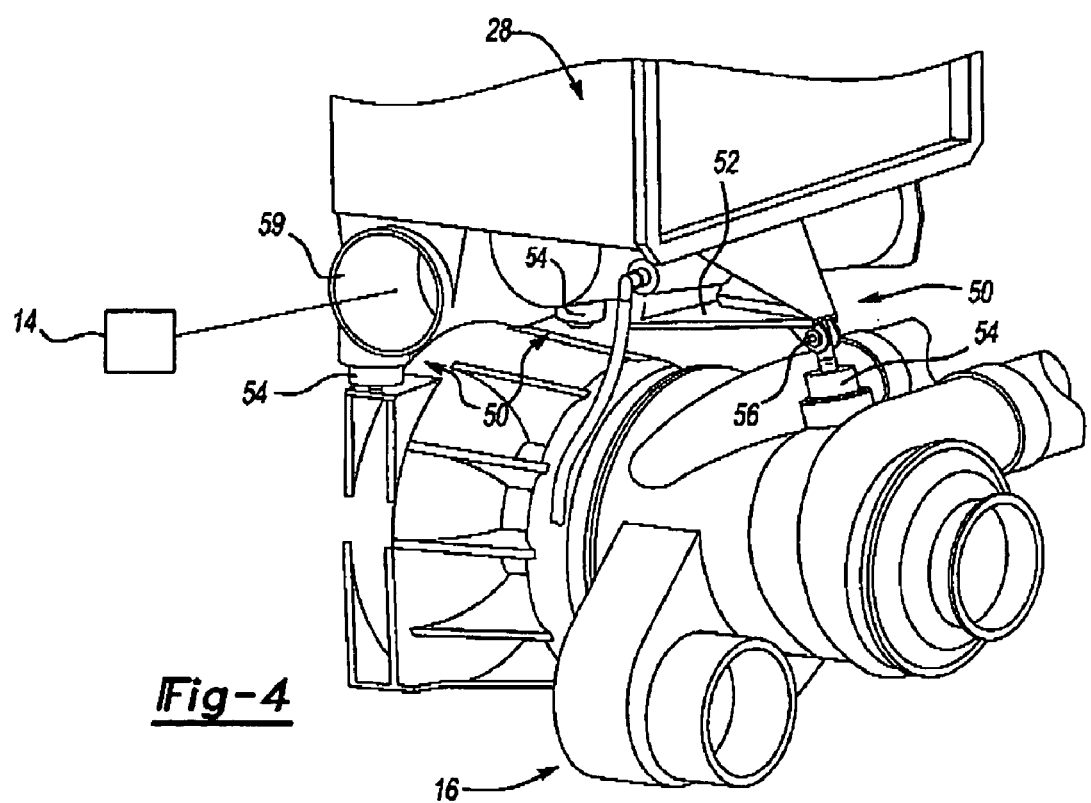

PACK AND A HALF CONDENSING CYCLE PACK WITH COMBINED HEAT EXCHANGERS

BACKGROUND OF THE INVENTION

This invention relates to an air generation unit (AGU) suitable for an aircraft, and more particularly, the invention relates to a pack and a half air generation unit configuration utilizing two air cycle machines (ACM) with each preferably having two turbines.

AGUs typically include at least one ACM and at least one heat exchanger that receives air from a pressurized air source, such as bleed air from an engine, to provide cooled air to the aircraft cabin and cockpit. The AGUs may be packaged within the wings and/or tail section of the aircraft. Accordingly, it is desirable to provide an AGU having a very small package to limit the amount of aircraft structure that must be removed to accommodate the AGU. Furthermore, the AGU must provide sufficient cooling for the size of the aircraft.

A pack and a half AGU has been developed for use in a Dash 8-400 in which two ACMs share a common heat exchanger. The pack and a half configuration provides increased cooling and smaller packaging than two separate AGUs each having their own heat exchanger. The Dash 8-400 utilizes a three wheel air cycle machine having a fan, a compressor, and a single turbine.

The Dash 8-400 AGU includes a heat exchanger having primary and secondary heat exchangers. Bleed air is taken from an intermediate or high pressure stage of a turbine engine. The bleed air is pre-cooled within the primary heat exchanger with the heat being rejected to ram air and then communicated to the compressor of the ACM. After compression, the air is communicated through a secondary heat exchanger to a condenser. Condensed water vapor is extracted by a water collector, and the dehumidifier air is sent to turbine where the air is expanded to generate cold air. The cold air is sent to an environmental control system (ECS) that further conditions and distributes the air to the aircraft.

A Boeing 777 utilizes AGUs with a single ACM and single heat exchanger. The Boeing 777 ACM is a four wheel configuration that includes a fan, a compressor, and first and second turbines. The operation of the AGU is similar to the Dash 8-400 AGU, but the second turbine receives the cold air from the first turbine and further expands the cold air to produce subfreezing air. The second turbine produces air sufficient to cool larger aircrafts.

Very large commercial aircrafts are being developed capable of carrying up to 1,000 passengers or more. These large aircraft require AGUs capable of producing very cold temperatures. However, the design constraints for the aircraft require very small packaging with very high reliability. The Dash 8-400 AGU configuration produces conditioned air that is not sufficiently cold for such a large aircraft. The Boeing 777 AGU configuration provides sufficiently cold air, however, up to four or more AGUs would be required for such a large aircraft, which would necessitate removing significant aircraft structure and would significantly increase weight. Therefore, what is needed is an improved AGU having a small package, increased reliability, and sufficiently cold air for the needs of a large aircraft.

SUMMARY OF THE INVENTION AND ADVANTAGES

The present invention provides an air generation unit (AGU) including a pressurized air source, such as a turbine engine providing bleed air. First and second air cycle machines (ACM) are fluidly connected to the pressurized air source for receiving the air. A heat exchanger interconnects the first and second ACMs. The heat exchanger includes a primary heat exchanger that cools the air from the air source. The ACMs each include a compressor receiving the air from the primary heat exchanger to provide compressed air. The compressed air is sent to a secondary heat exchanger to be cooled. The compressed air is passed through a condenser and a water collector to remove moisture from the air for being sent to a first turbine. The first turbine expands the dehumidified air to produce a first conditioned air having a first temperature. The conditioned air may be as low as approximately 34° F. A second turbine further expands the conditioned air to produce a second conditioned air having a second temperature lower than the first temperature, which may be subfreezing.

The heat exchanger mechanically supports the first and second ACMs by flexible isolators, which accommodates the thermal expansion of the heat exchanger throughout the operation of the AGU. The condenser, water collector, and a manifold, which fluidly connect components of the ACMs, are centrally mounted in such a fashion to provide ease of access to the components when servicing the AGU. Accordingly, the above invention provides an improved AGU having a small package, increased reliability, and sufficiently cooled air for the needs of a large aircraft.

BRIEF DESCRIPTION OF THE DRAWINGS

Other advantages of the present invention can be understood by reference to the following detailed description when considered in connection with the accompanying drawings wherein:

FIG. 3 is a bottom perspective view of the opposing side of the AGU shown in FIG. 2;

FIG. 4 is an enlarged perspective view depicting the mounts between the heat exchanger and ACMs;

DETAILED DESCRIPTION OF THE PREFERRED EMBODIMENT

Figure 1:
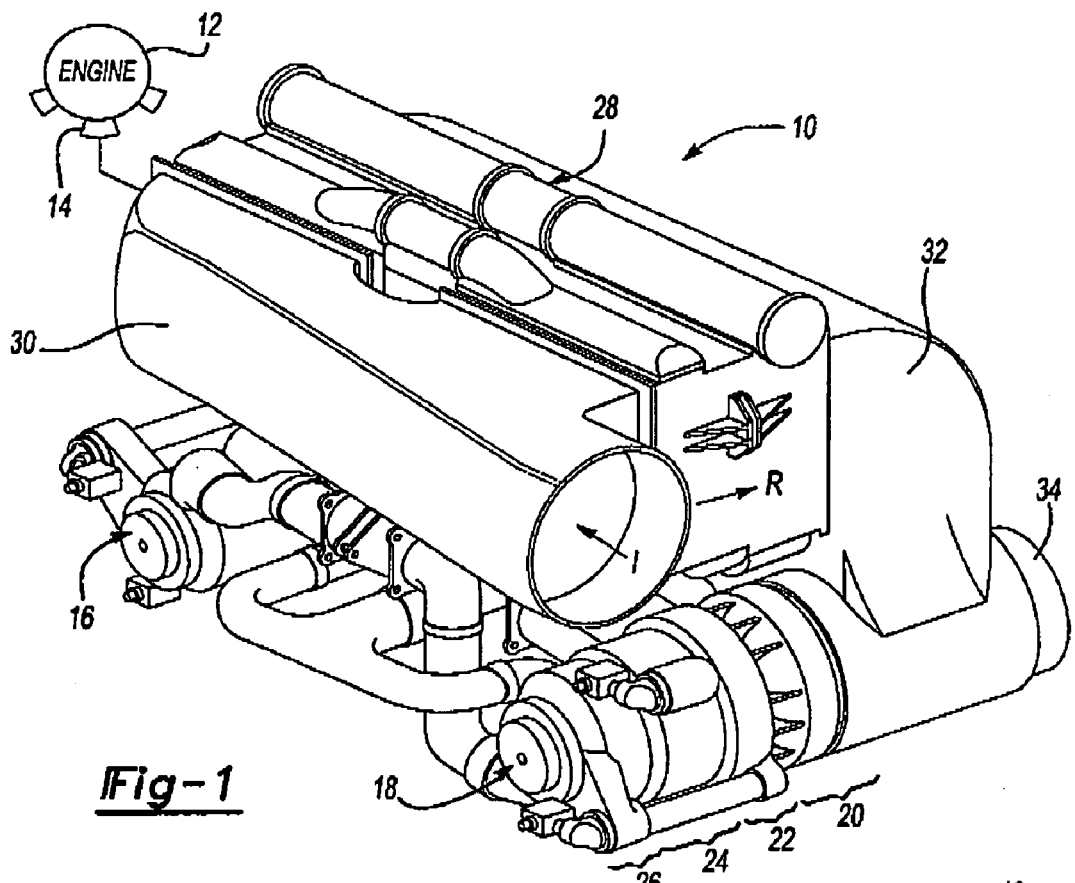
FIG. 1 is a front perspective view of the present invention AGU.
Figure 2:
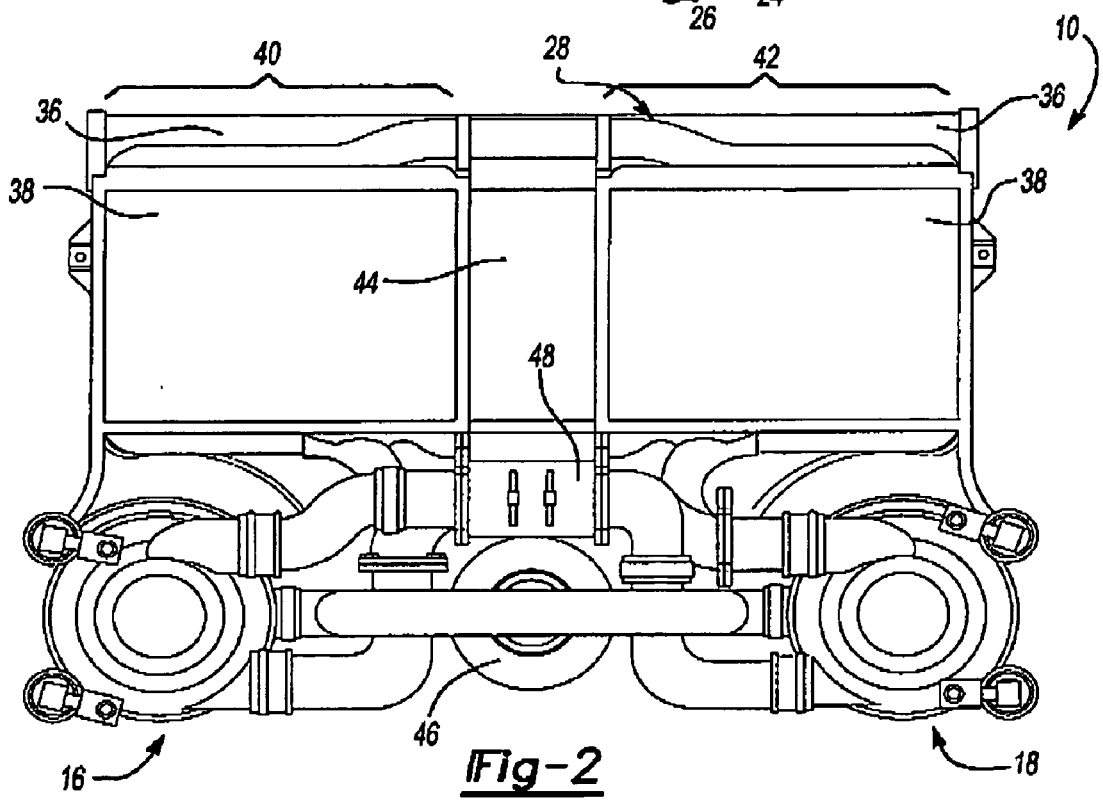
FIG. 2 is a side elevational view of the AGU shown in FIG. 1.

An air generation unit (AGU) 10 is shown in FIGS. 1–3. The AGU 10 receives pressurized air from an intermediate or high pressure stage of an engine 12 through a bleed valve 14. The pressurized air is conditioned by the AGU 10 to provide conditioned air to the aircraft.

The present invention AGU 10 includes first 16 and second 18 air cycle machines (ACM). The present invention ACMs 16 and 18 are a four wheel configuration including a fan 20, a compressor 22, and first 24 and second 26 turbines. The ACMs 16 and 18 are mechanically mounted to a shared or common heat exchanger 28, which is mounted to the aircraft frame. A ram air inlet header 30 provides ram air to the heat exchanger 28 with the ram air exiting the heat exchanger 28 through ram air outlet header 32 and ram outlets 34. The fan 20 helps to draw the air through the headers 30 and 32.

As best shown in FIG. 1, the ram air enters the header 30 along a path I. The ram air passes through the heat exchanger 28 in a ram air flow path R, which is transverse to the path I defined by the inlet header 30. Referring now to FIG. 2, the heat exchanger 28 includes a primary 36 and secondary 38 heat exchangers. The primary heat exchanger 36 is an air-to-air heat exchanger that cools the bleed air from the engine 12 prior to being compressed by the compressor 22. The secondary heat exchanger 38 cools the compressed air from the compressor 22 prior to being sent to the turbines 24 and 26 for expansion and further cooling. The heat exchanger 28 is divided into first 40 and second 42 heat exchanger portions in the no flow direction to reduce the thermal stress on the heat exchanger 28, which is the structural back bone of the AGU 10. Specifically, the flow direction is indicated by the path I through the ram air inlet header 30. Dividing the heat exchanger 28 along the direction of the path I reduces the thermal stresses on the heat exchanger 28 based upon mathematical models. However, splitting the heat exchanger 28 in the direction of the ram air flow R as it passes through the heat exchanger 28 has a less beneficial effect on the thermal stresses of the heat exchanger. The reduced thermal stress achieved by the split heat exchanger 28 extends the life of the heat exchanger 28 and AGU 10.

The condenser 44 is arranged between the first 40 and second 42 heat exchanger portions so that the condenser 44 may be shared by the ACM 16 and 18. The condenser 44 generates water vapor capable of being collected by the water collector 46 to dehumidify the air received from the secondary heat exchanger 38. The water collector 46 is positioned beneath the condenser 44 to provide more efficient collection of water vapor by taking advantage of gravity. The condenser 44 and collector 46 are arranged centrally between the ACM 16 and 18. A manifold 48 may be mounted between the condenser 44 and water collector 46 to provide an efficient centralized connection between the ACMs 16 and 18, and other components of the AGU. As a result, many hoses and couplings may be integrated into the structure of the manifold 48, and other centrally located components to increase reliability.

FIG. 4 depicts the mounts between the ACM 16 and 18 and the heat exchanger 28 that further reduce the stress on the heat exchanger 28 and isolate the vibrations produced by the ACM 16 and 18 and prevent them from being transmitted to the aircraft through the heat exchanger 28. The mounts 50 may be arranged in a triangular pattern between each of the ACM 16 and 18 and the heat exchanger 28. Specifically, the mounts 50 may be arranged between each ACM and its respective heat exchanger portion 40 and 42. The mounts 50 may include a bracket 52 connected to the heat exchanger 28 interconnected via a clevis 56 to a flexible isolator 54 mounted on the ACMs 16 and 18. For other mounts 50, the bracket 52 and clevis 56 may not be necessary. The heat exchanger 28 may be mounted to the air frame by frame mounts 57, best shown in FIG. 5.

Figure 5:
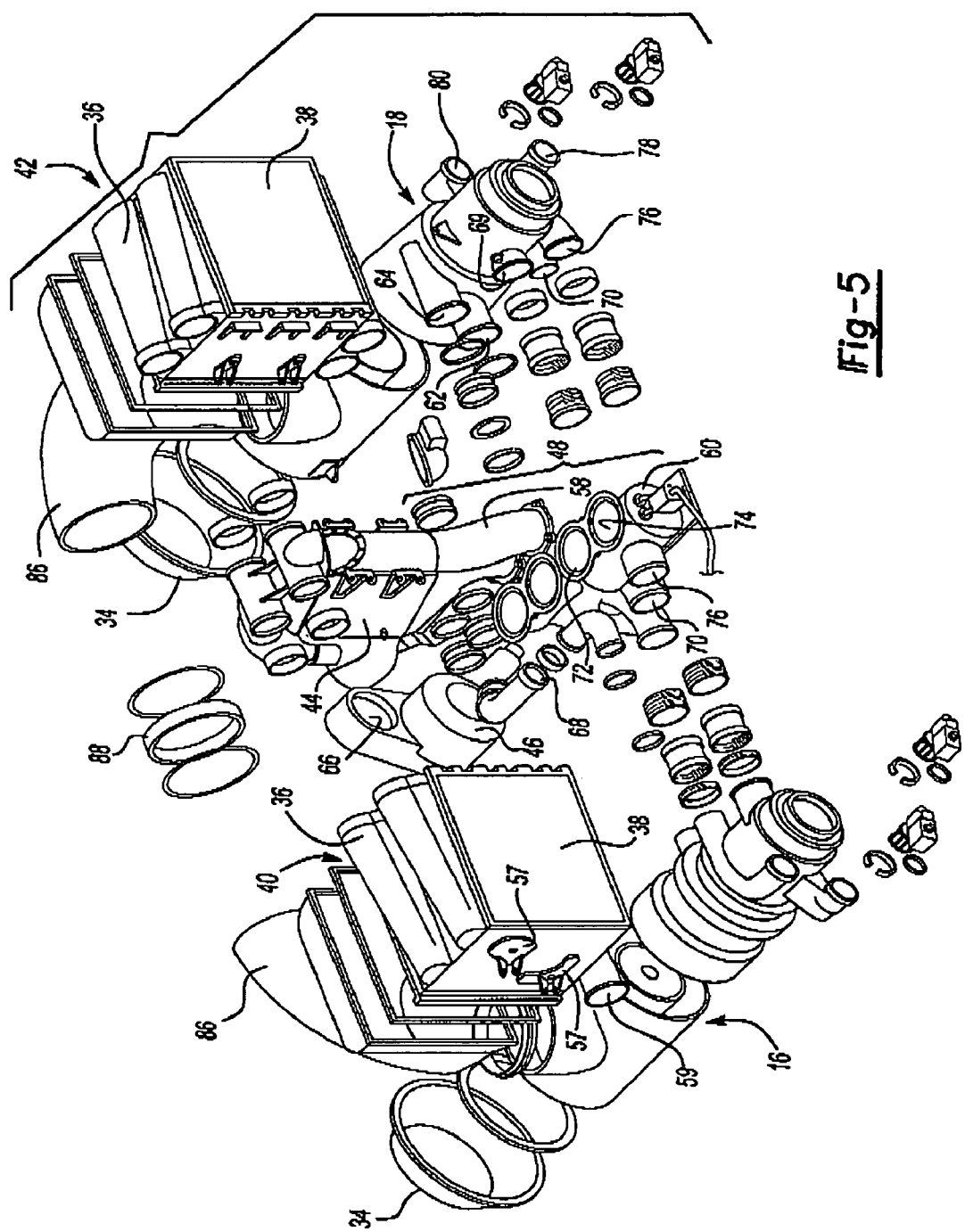
FIG. 5 is a side exploded perspective view of a present invention AGU.
Figure 6:
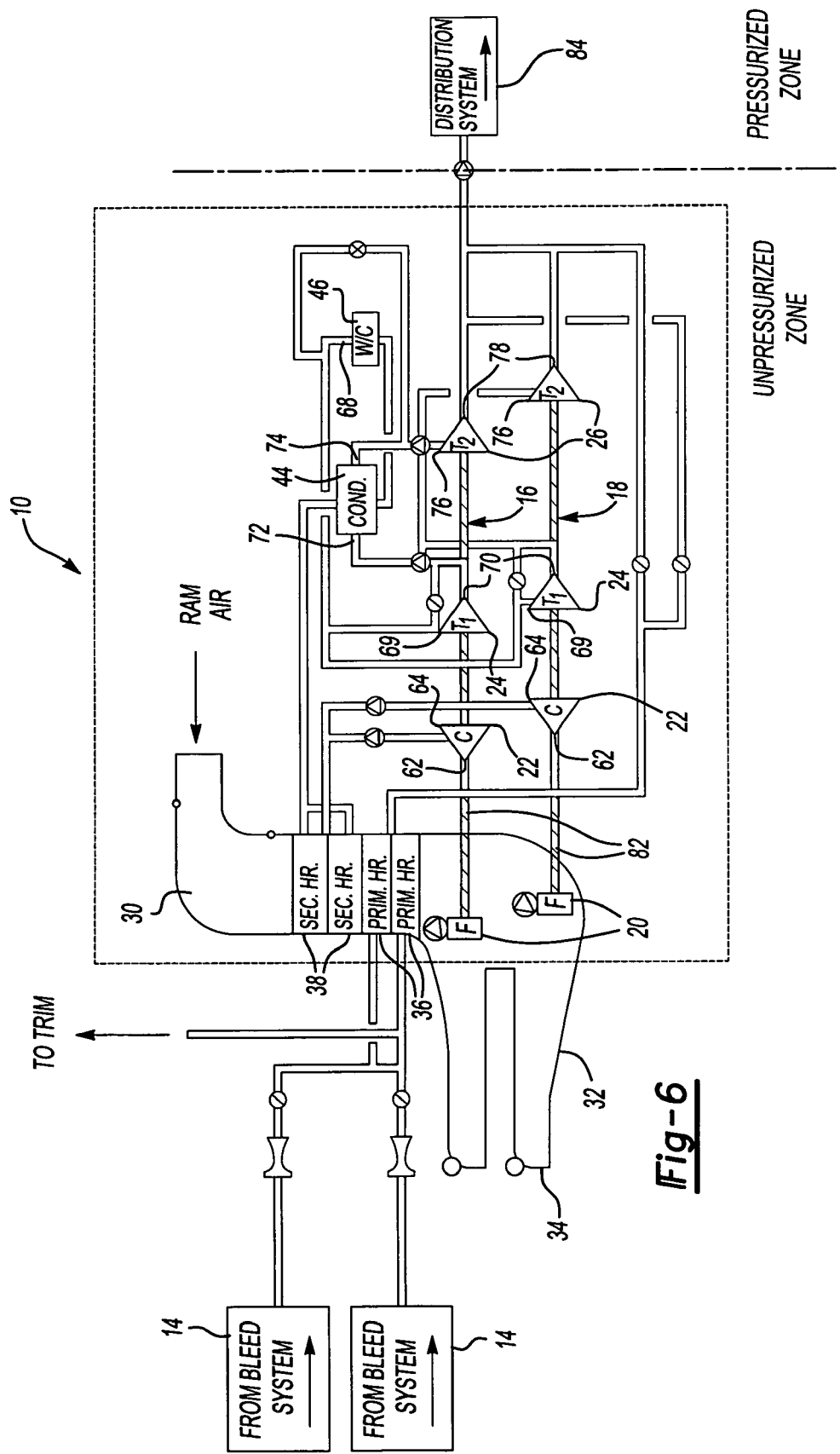
FIG. 6 is a schematic view of the present invention AGU.

With continuing reference to FIG. 5, pressurized air from the engine enters through a bleed air inlet 59. The high temperature bleed air passes through the primary heat exchanger 36 to cool the air to a temperature that is suitable for use with aluminum components. The cooled air from the primary heat exchangers 36 enters the compressor inlet 62 where it is compressed by the compressor 22 to provide compressed air. The temperature of the compressed air has been raised by the compressor 22 such that it must be passed through a secondary heat exchanger 38. The compressed air exits the compressor 22 through the compressor outlet 64 and passes into the secondary heat exchanger 38. The cooled air from the secondary heat exchanger 48 is communicated to the condenser 44 to form water vapor of sufficient character to be collected the water collector 46. The dehumidified air exits the water collector outlet 68 and enters the first turbine inlet 69. The dehumidified air is expanded by the first turbine 24 to produce a first conditioned air having a first temperature that may be as low as approximately 34° F.

The manifold 48 may include an upper 58 and lower 60 manifold portion secured to one another. The manifold 48 is centrally located between the ACMs and integrates numerous passageways that in the prior art have typically been defined by hoses secured between the ACM and other AGU components. The conditioned air from the first turbine outlet 70 is communicated through the lower manifold 60 and sent to the condenser 44 through condenser cold inlet 72. The condenser 44 and water collector 46 remove additional moisture from the conditioned air from the first turbine 24. The further dehumidified air is communicated through the manifold 48 through condenser cold outlet 74 into the second turbine inlet 76 where the air is further expanded by the second turbine 26. The conditioned air temperature produced by the second turbine 26 is lower than the conditioned air temperature produced by the first turbine 24. The conditioned air produced by the second turbine 26 may be of subfreezing temperatures, which better enables the AGU 10 to cool a large aircraft.

Air from a second turbine conditioned air outlet is sent to an environmental control unit (ECU) 84 for cooling of the aircraft. The second turbine conditioned air outlet 78 may have a first turbine air conditioned air outlet and other air sources communicated therewith to adjust the humidity and temperature of the air sent to the ACU 84.

The ACMs 16 and 18 are four wheeled machines having a shaft 82 supporting the fan 20, compressor 22, and first 24 and second 26 turbines. The fan 20 is arranged within the ram air flow. The fan 20 pulls air through the heat exchangers 28 if the aircraft is not moving. To facilitate servicing and assembly of the AGU 10, the ram air outlet header 32 may comprise ram air outlet header portion 86 secured to one another centrally by a seal 88.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An air generation unit comprising:
    a pressurized air source providing air;
    first and second air cycle machines fluidly connected to said pressurized air source for receiving the air, said first and second air cycle machines including a compressor compressing the air to provide compressed air, and at least one of said air cycle machines including first and second turbines with said first turbine expanding the compressed air to a first conditioned air having a first temperature, and said second turbine expanding the first conditioned air to a second conditioned air having a second temperature lower than said first temperature; and a heat exchanger interconnecting said first and second air cycle machines, said heat exchanger cooling the air and the compressed air respectively from said pressurized air source and said compressor of both of said first and second air cycle machines, wherein said air cycle machines are supported by said heat exchanger.

2. The unit according to claim 1, wherein flexible isolators are arranged between said air cycle machines and said heat exchanger permitting thermal expansion of said heat exchanger.

3. An air generation unit comprising:
a pressurized air source providing air;
first and second air cycle machines fluidly connected to said pressurized air source for receiving the air, said first and second air cycle machines including a compressor compressing the air to provide compressed air, and at least one of said air cycle machines including first and second turbines with said first turbine expanding the compressed air to a first conditioned air having a first temperature, and said second turbine expanding the first conditioned air to a second conditioned air having a second temperature lower than said first temperature; and
a heat exchanger interconnecting said first and second air cycle machines, said heat exchanger cooling the air and the compressed air respectively from said pressurized air source and said compressor of both of said first and second air cycle machines, wherein said heat exchanger includes first and second heat exchanger portion with said first and second air cycle machines respectively supported by said first and second heat exchanger portions, said first and second heat exchanger portions having a ram air flow path in a direction, and a ram air inlet header providing ram air to said first and second heat exchanger portions and defining a inlet path transverse to said ram air flow path.

4. The unit according to claim 3, wherein a condenser is mounted between said first and second heat exchanger portions.

5. The unit according to claim 4, wherein a water collector is mounted beneath said condenser between said first and second air cycle machines.

6. The unit according to claim 5, wherein a manifold is mounted between said condenser and said water collector fluidly connecting said condenser with said water collector, and said manifold is mounted and between said first and second air cycle machines fluidly connecting said first and second heat exchanger portions with said compressor.

7. The unit according to claim 3, wherein a condenser is fluidly connected between said first and second heat exchanger portions.

8. The unit according to claim 7, wherein a water collector is fluidly connected beneath said condenser between said first and second air cycle machines.

9. The unit according to claim 8, wherein a manifold fluidly connected between said condenser and said water collector fluidly connecting said condenser with said water collector, and said manifold is mounted and between said first and second air cycle machines fluidly connecting said first and second heat exchanger portions with said compressor.

10. An air generation unit comprising:
a pressurized air source providing air:
first and second air cycle machines fluidly connected to said pressurized air source for receiving the air, said first and second air cycle machines including a compressor compressing the air to provide compressed air, and at least one of said air cycle machines including first and second turbines with said first turbine expanding the compressed air to a first conditioned air having a first temperature, and said second turbine expanding the first conditioned air to a second conditioned air having a second temperature lower than said first temperature; and
a heat exchanger interconnecting said first and second air cycle machines, said heat exchanger cooling the air and the compressed air respectively from said pressurized air source and said compressor of both of said first and second air cycle machines,
wherein said compressor and first and second turbines are mounted on a common shaft.

* * * * *